July 19, 1960

A. B. TINSLEY ET AL 2,945,937

SUBMERGED-ARC WELDING

Filed Sept. 9, 1958

INVENTORS
ANTONY BRIAN TINSLEY
KENNETH GUEST

BY Cushman, Darby & Cushman
ATTORNEYS

_United States Patent Office_ 2,945,937
Patented July 19, 1960

2,945,937

SUBMERGED-ARC WELDING

Antony Brian Tinsley, Stourport-on-Severn, and Kenneth Guest, Brierley Hill, England, assignors to Imperial Chemical Industries Limited, Millbank, London, England, a corporation of Great Britain Filed Sept. 9, 1958, Ser. No. 760,038

Claims priority, application Great Britain Sept. 9, 1957

3 Claims. (Cl. 219—73)

The invention relates to the joining of metal by fusion welding, and in particular to the method of welding known as submerged-arc welding.

In submerged-arc welding, powdered or granular flux of poor thermal conductivity is applied to both the upper and the lower surfaces of a seam to be welded with the objects of eliminating oxidation, and of keeping the weld cooling rate down to an acceptable value. It has been proposed to provide a flux backing to the welding seam in the form of a flexible container of granular flux which is pressed against the lower surface of the seam to be welded. Several means for pressing the container of flux against the workpiece have been described. Among these are: a trough, in which the flux container rests, which is forced upwardly by springs; an inflatable tube pressing against the flux container; a trough lifted by means of wedges; spring-loaded rollers; hydraulic rams for lifting a trough supporting the flux container; and combinations of these means. It has also been proposed to introduce through a delivery tube granular flux into a trough provided with an inflatable tube, the upper edges of the trough being in close contact with the workpiece, and the flux is forced against the seam by inflating the tube.

This latter method is intended to be used for welding thin sheets and in order to maintain a suitably sized weld bead on the underside of the seam it is necessary for the air pressure in the inflated tube to be maintained within certain critical limits. Even so, particularly on longitudinal single pass welds, fluctuations of pressure within the inflated tube, and local variations in the compacting of the flux, cause undesirable variations in the underbead size.

According to the invention, we provide a submerged-arc welding apparatus comprising a trough for containing flux having a base portion comprising one slidable member resting on an inclined surface and means for moving the slidable member on the inclined surface whereby the sliding member as it is moved on the surface is also moved towards or away from the trough opening.

According to a feature of the invention, the slidable member has a series of parallel inclined surfaces presenting in cross-section a substantially saw-tooth appearance, the said inclined surfaces being in slidable contact with complementary inclined surfaces.

The apparatus preferably comprises a trough having a base portion which is formed of a plurality of truncated wedge-shaped members arranged in pairs, an inclined face of one of each pair being in slidable contact with an inclined face of the other in such a manner that the upper and lower surfaces are substantially parallel. The pairs of members are arranged in end to end relationship with adjacent pairs of members in such a manner that the thin ends of the members abut against the thick ends of adjacent members, and the end portions of the trough are adapted to impart longitudinal movement to the upper and lower members by means of an adjustable screw. The trough may conveniently be machined out of a solid backing bar in order to ensure accuracy and rigidity.

The apparatus herein described is an improvement on previous devices used in making longitudinal welds by the submerged-arc process, in that conditions which were regarded as critical are now no more critical than with any other welding process.

We have found that the pressure applied in lifting the flux into contact with the underside of the weld is not necessarily the principal factor affecting weld quality. It is necessary to use flux of a given granulation on the underside of the weld. During the welding operation the flux immediately under the fusion zone melts and coalesces, thus occupying less space than the granulated materials and a free space is formed below the bead. The molten underbead falls into the free space and thus forms a uniform underbead when solid.

The use of a flux from which fine particles have been removed, in conjunction with apparatus in accordance with the invention will enable a variety of underbead sizes to be produced by variation of welding speed and/or welding current. Thus, for example, increasing the heat input causes the fusion of more flux and thereby correspondingly increases the available underbead space. The presence, in the flux, of an excessive amount of fine material reduces the amount of free space between the flux granules so that a smaller underbead space is formed when the flux melts. Commercial flux may contain amounts of fine material which may vary from batch to batch due to fragmentation during transit. The fine material is removed before applying the flux to the joint by sieving; the material passing through a sieve having eight meshes per inch is then sieved on a twenty-mesh sieve and the material retained on this sieve is used for the welding operation.

It is preferable that the flux should be lifted mechanically through a given distance rather than be lifted by an inflatable tube which, as mentioned above, may be subject to fluctuations of pressure and the flux container herein described enables the flux to be lifted and held against the lower side of the workpiece in a convenient manner.

The apparatus is particularly valuable for thin gauge steels of SAE 4130 quality, the thickness of the sheets to be welded being preferably 0.064" to 0.120", and can be carried out at welding speeds of 50/70 in./min.

An embodiment of an apparatus in accordance with the invention is illustrated in the accompanying drawings accompanying the provisional specification, of which:

Figure 1:
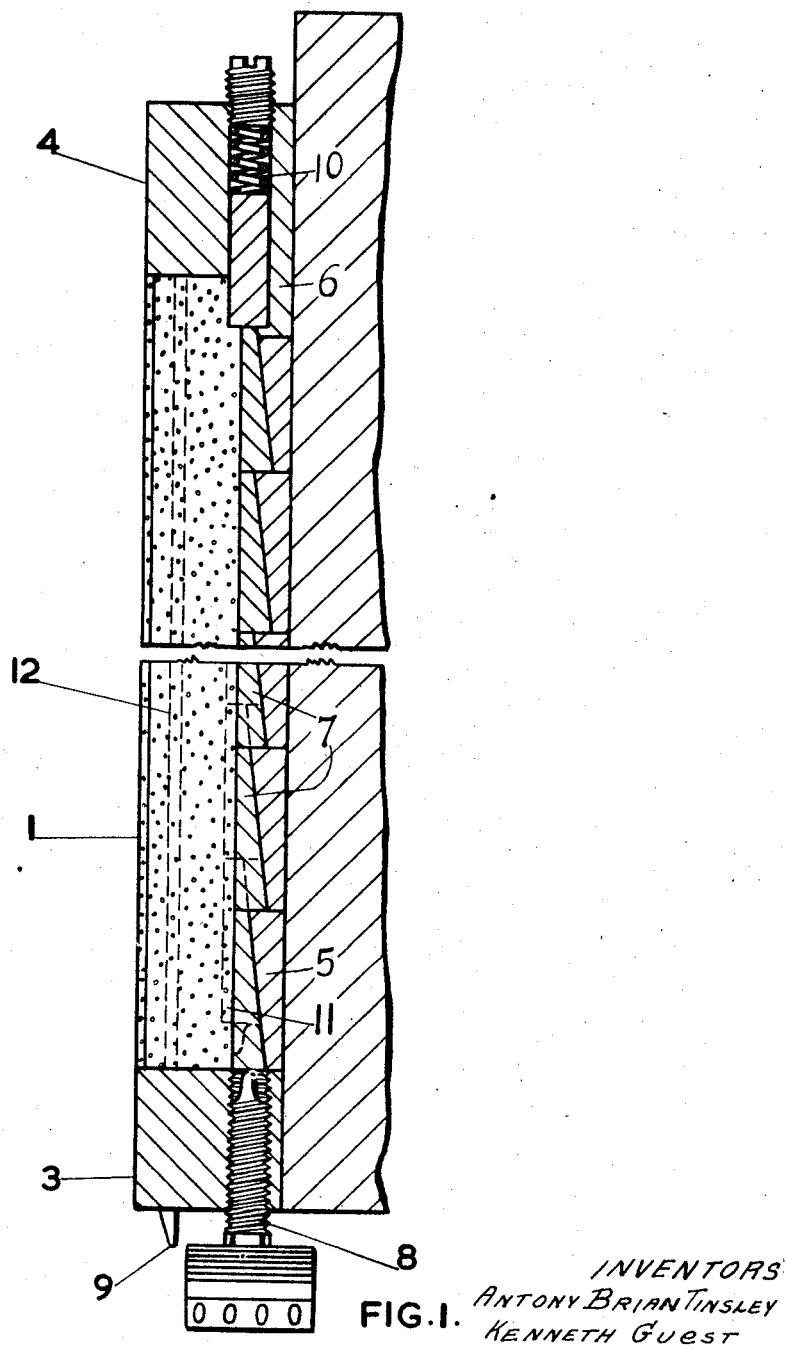
Figure 1 represents a longitudinal cross-section of the flux container.
Figure 2:
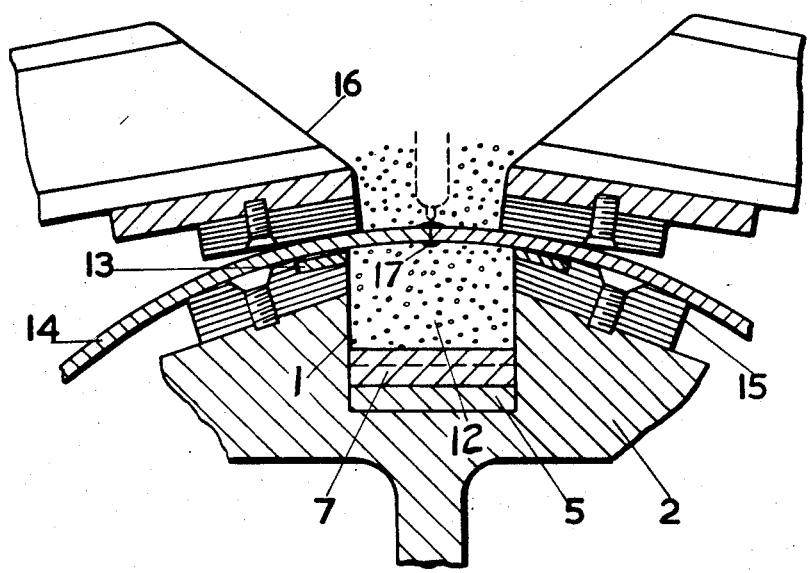
Figure 2 is a transverse cross-section of the flux container showing the workpiece clamped in position.

Referring to the drawings, a trough 1 machined in a solid steel backing beam 2 has parallel sides and is closed at its ends by end pieces 3 and 4. Within the trough 1, at the bottom, are arranged a number of wedges 5 in end-to-end relationship, the thin end of each abutting against the thick end of the adjacent wedge. Longitudinal movement of the wedges 5 is prevented by the abutment of the end wedges against the end piece 3 and the extension 6 of the end piece 4. Superposed upon the wedges 5 is a second series of wedges 7 of identical size and shape to wedges 5, each of the wedges 7 resting upon one of the wedges 5, the inclined faces in contact and the thick end of each of the wedges 7 coinciding with the thin end of each of the wedges 5. The arrangement of wedges 7 is thus similar to that of wedges 5 but in the opposite sense.

The thick end of the layer of wedges 7 abuts against an adjusting screw 8, the head of which is provided with graduations for use with the pointer 9. The thin end of wedges 7 abuts against a spring-loaded plunger 10 so that the wedges 7 are held tightly against each other. Movement of the adjusting screw 8 inwardly causes movement of the wedges 7 towards the end piece 4 and at the same time the wedges are forced up the inclined plane at the contacting faces of wedges 5 and 7 to a position shown in broken lines at 11 in Figure 1. Movement towards the top of the trough is thus imparted to the flux 12. In order to prevent accumulation of small flux particles between the wedges and other crevices, a rubber overlay may be interposed between wedges and flux.

In operation the trough 1 is filled with flux 12 of the required granulation and thermally insulated from the workpiece 14 by means of asbestos base insulating pads 15, which are protected from wear by stainless steel strip 13, the joint to be welded being located centrally with respect to the trough. The adjusting screw 8 is then turned to move the wedges 7 towards the end piece 4 thus imparting an upward movement to the flux 12 which is forced into contact with the workpiece 14. Welding of the joint is then carried out by the submerged-arc process, clamping fingers 16 closely disposed along either side of the joint being used to retain the flux at the top of the joint. Fusion of the flux immediately below the fusion bead creates a small void dependent in size upon the granule size of the flux and this void is then occupied by the underbead 17.

As an alternative, all the wedges 5 may be formed in a single piece and all the wedges 7 may be formed into a second piece. Each piece thus presents a substantially saw-tooth appearance in cross-section.

We claim:

1. A submerged-arc welding apparatus comprising a trough for containing flux, an adjustable base portion in said trough, said base portion consisting of a slidable member resting on an inclined surface, means for imparting relative sliding movement between said member and surface whereby said member is moved towards or away from the trough opening, and means for positively locating said member in an adjusted position.

2. A submerged-arc welding apparatus as claimed in claim 1 in which the slidable member has a series of parallel inclined surfaces presenting in cross-section a substantially saw tooth appearance, the said inclined surfaces being in slidable contact with complementary inclined surfaces.

3. A submerged-arc welding apparatus comprising a trough for containing flux having a base portion which is formed of a plurality of truncated wedge-shaped members arranged in pairs, an inclined face of one member of a pair being in slidable contact with an inclined face of the other member of the pair, the pairs of members being arranged in end-to-end relationship whereby the thinner end of one member of a pair abuts against the thicker end of the corresponding member of an adjacent pair, and means for moving one of the members whereby the members nearer the trough opening are caused to move towards or away from the opening.

References Cited in the file of this patent

UNITED STATES PATENTS

| | | |
|---|---|---|
| 2,014,240 | Tarbox et al. | Sept. 10, 1935 |
| 2,412,065 | Rudy et al. | Dec. 3, 1946 |